(12) United States Patent
Loecher

(10) Patent No.: US 6,847,918 B2
(45) Date of Patent: Jan. 25, 2005

(54) METHOD AND APPARATUS FOR PROVIDING PREDICTIVE MAINTENANCE OF A DEVICE BY USING MARKOV TRANSITION PROBABILITIES

(75) Inventor: Markus Loecher, Princeton Jct., NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 412 days.

(21) Appl. No.: 10/017,013

(22) Filed: Dec. 14, 2001

(65) Prior Publication Data

US 2002/0128799 A1 Sep. 12, 2002

Related U.S. Application Data

(60) Provisional application No. 60/255,615, filed on Dec. 14, 2000, provisional application No. 60/255,614, filed on Dec. 14, 2000, and provisional application No. 60/255,613, filed on Dec. 14, 2000.

(51) Int. Cl.[7] .............................................. G06F 11/30
(52) U.S. Cl. ..................................................... 702/184
(58) Field of Search ............................ 702/184; 706/20; 378/118; 445/28

(56) References Cited

U.S. PATENT DOCUMENTS

| | | | | |
|---|---|---|---|---|
| 5,179,582 A | * | 1/1993 | Keller et al. .................. 378/96 |
| 5,307,444 A | * | 4/1994 | Tsuboka ....................... 706/20 |
| 5,396,531 A | * | 3/1995 | Hartley ........................ 378/108 |
| 5,465,321 A | * | 11/1995 | Smyth .......................... 706/20 |
| 5,754,681 A | * | 5/1998 | Watanabe et al. ........... 382/159 |
| 6,131,089 A | * | 10/2000 | Campbell et al. ............. 706/20 |
| 6,212,256 B1 | * | 4/2001 | Miesbauer et al. ......... 378/118 |
| 6,453,009 B2 | * | 9/2002 | Berezowitz et al. ........ 378/118 |
| 6,454,460 B1 | * | 9/2002 | Ramanathan et al. ....... 378/207 |
| 6,542,538 B2 | * | 4/2003 | Fischel et al. .............. 375/224 |

FOREIGN PATENT DOCUMENTS

| | | | | | |
|---|---|---|---|---|---|
| DE | 2402230 A | * | 8/1974 | ........... G01R/31/00 |
| DE | WO200026786 A | * | 5/2000 | ........... G06F/11/34 |

* cited by examiner

Primary Examiner—Marc S. Hoff
Assistant Examiner—Anthony Gutierrez

(57) ABSTRACT

A method for providing predictive maintenance of a device, comprises the steps of modeling as a time series of a discretely sampled signal representative of occurrences of a defined event in the operation of the device, the time series being modeled as two-state first order Markov processes with associated transition probabilities, wherein one state applies when the number of the occurrences exceeds a certain threshold, and the other state applies when the number of the occurrences falls below the certain threshold; computing the four transition probabilities the last N states $S_n$, where N is a predetermined number, conducting a supervised training session utilizing a set of J devices, which have failed due to known causes and considering the two independent probabilities and, the training session comprising computing the two-dimensional feature vectors for the initial M windows of N scans, computing the two-dimensional feature vectors for the final N number of scans, plotting a scatter-diagram of all 2D feature vectors, and deriving a pattern classifier by estimating the optimal linear discriminant which separates the two foregoing sets of vectors; and applying the classifier to monitor the persistence of occurrences of the defined event in the operation of the device.

7 Claims, 1 Drawing Sheet

METHOD AND APPARATUS FOR PROVIDING PREDICTIVE MAINTENANCE OF A DEVICE BY USING MARKOV TRANSITION PROBABILITIES

Reference is hereby made to copending:

U.S. Provisional Patent Application No. 60/255,615 filed Dec. 14, 2000 for NEURAL NETWORK-BASED VIRTUAL AGE ESTIMATION FOR REMAINING LIFETIME, in the names of Christian Darken and Markus Loecher;

U.S. Provisional Patent Application No. 601255,614 filed Dec. 14, 2000 for POLYNOMIAL BASED VIRTUAL AGE ESTIMATION FOR REMAINING LIFETIME PREDICTION, in the names of Markus Loecher and Christian Darken; and U.S. Provisional Patent Application No. 60/255,613 filed Dec. 14, 2000 for MARKOV TRANSITION PROBABILITIES FOR PREDICTIVE MAINTENANCE, in the name of Markus Loecher, of which priority is claimed and whereof the disclosures are hereby incorporated herein by reference.

Reference is also made to copending patent applications being filed on even date herewith:

METHOD AND APPARATUS FOR PROVIDING A VIRTUAL AGE ESTIMATION FOR REMAINING LIFETIME PREDICTION OF A SYSTEM USING NEURAL NETWORKS, in the names of Christian Darken and Markus Loecher, Ser. No. 10/017,015; and METHOD AND APPARATUS FOR PROVIDING A POLYNOMIAL BASED VIRTUAL AGE ESTIMATION FOR REMAINING LIFETIME PREDICTION OF A SYSTEM, in the names of Markus Loecher and Christian Darken, Ser. No. 10/017,014, and whereof the disclosures are hereby incorporated herein by reference.

BACKGROUND OF THE INVENTION

1. Field of the Invention

The present invention relates generally to the field of failure prediction and, more specifically to providing advance warning of impending failure for a variety of systems and devices, terms used herein interchangeably.

2. Description of the Related Art

Devices and apparatus used in various fields of medicine, industry, transportation, communications, and so forth, typically have a certain useful or operational life, after which replacement, repair, or maintenance is needed. Generally, the expected length of the operational life is known only approximately and, not untypically, premature failure is a possibility. Simple running time criteria are typically inadequate to provide timely indication of an incipient failure. In some applications, unanticipated failure of devices constitutes a at least a nuisance; however, more typically, unanticipated device failure may be a major nuisance leading to costly interruption of services and production. In other cases, such unexpected failure can seriously compromise safety and may result in potentially dangerous and life-threatening situations.

SUMMARY OF THE INVENTION

In accordance with an aspect of the invention, systems and/or devices are classified into "healthy" states and conditions which signal imminent malfunction is accomplished through computation of transition probabilities of selected variables.

In accordance with an aspect of the invention, a method for providing predictive maintenance of a device, comprises the steps of modeling as a time series of a discretely sampled signal representative of occurrences of a defined event in the operation of the device, the time series being modeled as two-state first order Markov processes with associated transition probabilities, wherein one state applies when the number of the occurrences exceeds a certain threshold, and the other state applies when the number of the occurrences falls below the certain threshold; computing the four transition probabilities the last N states $S_n$, where N is a predetermined number, conducting a supervised training session utilizing a set of J devices, which have failed due to known causes and considering the two independent probabilities and, the training session comprising computing the two-dimensional feature vectors for the initial M windows of N scans, computing the two-dimensional feature vectors for the final N number of scans, plotting a scatter-diagram of all 2D feature vectors, and deriving a pattern classifier by estimating the optimal linear discriminant which separates the two foregoing sets of vectors; and then applying the classifier to monitor the persistence of occurrences of the defined event in the operation of the device.

BRIEF DESCRIPTION OF THE DRAWINGS

The method and apparatus will be more fully understood from the following detailed description of preferred embodiments, in conjunction with the Drawing in which FIG. 1 (SOLE FIGURE) shows a block diagram for apparatus in accordance with the principles of the invention.

DETAILED DESCRIPTION OF PREFERRED EMBODIMENTS

Figure 1:
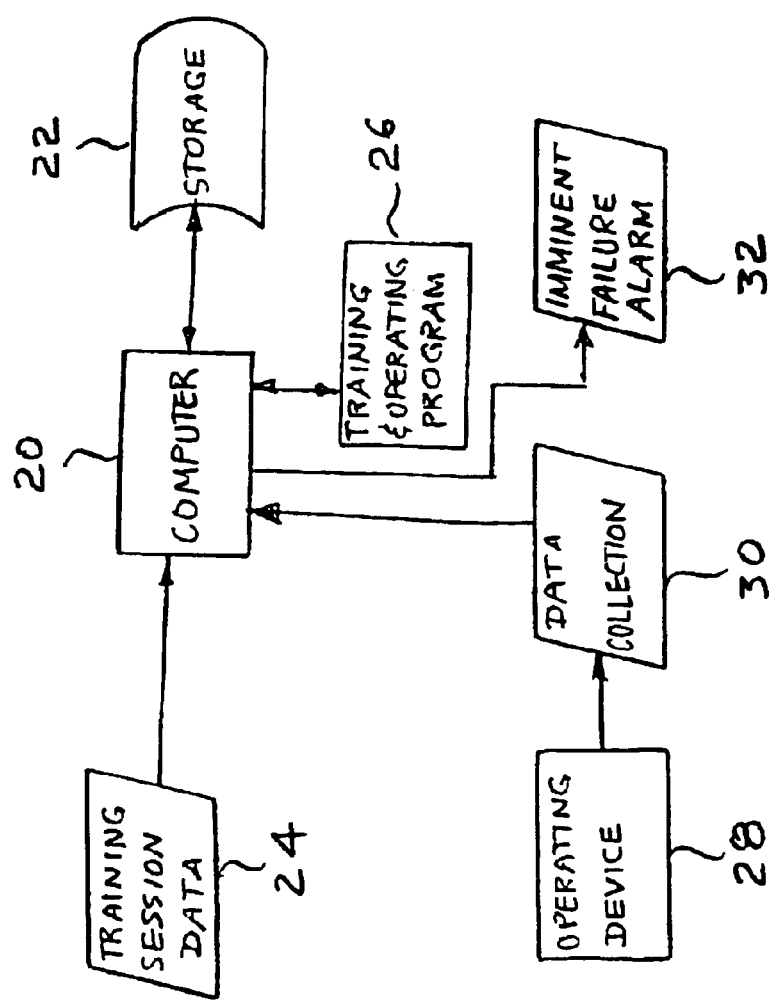

FIG. 1 shows a computer 20 equipped with data and program storage equipment 22 and a source 26 of programs for training and operating in an interactive manner as hereinafter described. Data from training sessions as further explained below is provided at 24. A device or system 28 which is being monitored provides data by way of data collection interface unit 30 to computer 20. Computer 20 provides an imminent or prospective alarm as to lifetime expiration and/or failure expectation at an alarm device 32.

An important exemplary application of principles of the present invention relates to predicting failure of X-ray tubes. Arcing is known to occur in X-ray tubes. In the case of X-ray tubes, the frequency of occurrence of high-voltage (HV) arcs is chosen as the main input to the algorithm in the present exemplary embodiment. HV-arcing is characterized by a lightning-like discharge and a temporary voltage breakdown inside vacuum-insulated high-voltage devices. Typically, it is a frequently occurring but usually short-lived malfunction in such devices.

The method in accordance with the present invention is widely applicable in many fields. In order to facilitate understanding of the invention and to illustrate the use of device-specific information and parameters, the invention will next be more fully described by way of an exemplary, non-limiting embodiment relating to X-ray tubes; where appropriate, generally applicable notions are also stated in the context of the specific exemplary embodiment. The example used is also appropriate in that an unexpected failure of such an X-ray tube, for example during a critical surgical procedure, should be avoided insofar as is possible.

Suppose $x_n$ (n=1 . . . N) represents the time series of a discretely sampled signal which for the sake of clarity is assumed in the present embodiment to be the number of high-voltage arcs measured during the active phase of an X-ray tube. Furthermore, it is assumed that the X-ray tubes are operated in a non-continuous manner, which is characteristic for a clinical environment where discrete, consecutive "scans" represent its main usage.

The physical causes for HV-arcs primarily fall into three classes: (i) leaks in the casing, which lead to a reduced vacuum, (ii) microscopic particles, which are usually destroyed by the arcing, and (iii) sharp protrusions on the surface of the anode or cathode. Arcing due to leaks marks the irreversible decay of a tube's proper functioning. On the contrary, the latter two disruptions are transitory and reversible. In fact, in cases (ii) and (iii) arcing (a symptom) serves to eradicate its own cause by destroying the particles or protrusions.

Consistent with this physical picture, the time-series $x_n$ shows noticeable persistence and cannot be modeled by e.g. a Poisson process. Removal of particulates requires a sufficient number of consecutive HV-arcs, which manifests itself as strong temporal correlations within $x_n$. The fundamental problem is to decide, based solely upon a finite history of arcing, whether the tube is about to irreversibly fail or whether the malfunctioning can be considered transitory.

In accordance with an aspect of the invention, the timeseries $x_n$ is modeled as two-state first order Markov processes with associated transition probabilities $p(i|j)$. State 1 is assumed if the number of arcs exceeds a certain threshold T, state 0 if it falls below the same number:

$$S_n = \begin{cases} 0 & \text{if } x_n \leq T \\ 1 & \text{if } x_n > T \end{cases}$$

We typically take T to be zero. Assuming $x_n$ to result from an underlying $1^{st}$ order Markov processes implies stochastic switching between the two states. The transition probability $p(i|j)$ is the switching probability from state j to state i. More accurately, it is the probability that $S_n=i$ given that $S_{n-1}=j$. These four transition probabilities are computed over the last N states $S_n$, where N typically is of the order of a few hundred scans. Note that the transition probabilities of a $k^{th}$ order Markov process would depend on the last k states: $p(S_n)=p(S_n|S_{n-1}, \ldots, S_{n-k})$.

We simplify the classification problem by only considering the two probabilities $p(1|1)$ and $p(1|0)$. Note that the two remaining probabilities are not independent: $p(0|1)=1-p(1|1)$ and $p(0|0)=1-p(1|0)$. Utilizing a set of J tubes, which have failed due to known causes, the supervised training strategy in accordance with the principles of the invention is as follows:

Compute the two-dimensional feature vectors $f_i=\{p(1|1), p(1|0)\}_i$ for the initial M windows of N scans.

Compute the two-dimensional feature vectors $f_f=\{p(1|1), p(1|0)\}_f$ for the final N number of scans.

Plot a scatter-diagram of all 2D feature vectors $(f_i)_n$ and $(f_f)_n$, (n=1 . . . J).

Now the problem is reduced to a classic pattern classifier: Estimate the optimal linear discriminant, which separates the two sets of vectors.

The classifier thereby obtained is applied to monitor the persistence of arcing in operating tubes. At each scan the transition probabilities are updated and the feature vector $f=\{p(1|1), p(1|0)\}$ constructed. If f falls into the "bad" region of the classifier, the tube is deemed close to the end of its useful life and advance warning of imminent failure is given.

It will be understood that the invention may be implemented in a number of ways, utilizing available hardware and software technologies. Implementation by way of a programmable digital computer is suitable, with or without the addition of supplemental apparatus. A dedicated system may also be used, with a dedicated programmed computer and appropriate peripheral equipment. When various functions and subfunctions are implemented in software, subsequent changes and improvements to the operation are readily implemented.

While the present invention has been described by way of illustrative embodiments, it will be understood by one of skill in the art to which it pertains that various changes and modifications may be made without departing from the spirit of the invention. Such changes and modifications are intended to be within the scope of the claims following.

What is claimed is:

1. A method for providing predictive maintenance of a device, comprising the steps of:

modeling as a time series $x_n$ of a discretely sampled signal representative of occurrences of a defined event in the operation of said device, said time series $x_n$ being modeled as two-state first order Markov processes with associated transition probabilities $p(i|j)$, wherein state 1 applies when a number of said occurrences exceeds a certain threshold T, and state 0 applies when a number of said occurrences falls below said certain threshold T, being represented as:

$$S_n = \begin{cases} 0 & \text{if } x_n \leq T \\ 1 & \text{if } x_n > T \end{cases}$$

wherein said transition probabilities $p(i|j)$ are switching probabilities from state j to state i, characterized by the probability that $S_n=i$ given that $S_{n-1}=j$, being a total of four transition probabilities;

computing said four transition probabilities for a last N states $S_n$, where N is a predetermined number;

conducting a supervised training session utilizing a set of J devices, which have failed due to known causes and considering the two independent probabilities $p(1|1)$ and $p(1|0)$, said training session comprising:

computing two-dimensional feature vectors $f_i=\{p(1|1), p(1|0)\}_i$ for an initial M windows of N scans, thereby a first vector set, computing two-dimensional feature vectors $f_f=\{p(1|1), p(1|0)\}_f$ for o final N number of scans, thereby forming a second vector set, plotting a scatter-diagram of all two-dimensional feature vectors $(f_i)_n$ and $(f_f)_n$, (n=1 . . . J), and deriving from the scatter-diagram a pattern classifier by estimating an optimal linear discriminant which separates the first and second vector sets; and applying said classifier to monitor a persistence of occurrences of said defined event in an operation of said device.

2. A method for providing predictive maintenance of a device as recited in claim 1, including the steps of:

updating said transition probabilities at each scan; and constructing a feature vector $f=\{p(1|1), p(1|0)\}$.

3. A method for providing predictive maintenance of a device as recited in claim 2, including the step of:

providing a warning of imminent failure of said device if f falls into a region of said classifier indicating failure prediction.

4. A method for providing predictive maintenance of an X-ray tube, comprising the steps of:

modeling as a time series $x_n$ of a discretely sampled signal representative of occurrences of arcing in an operation of said tube, said time series $x_n$ being modeled as two-state first order Markov processes with associated transition probabilities p(i|j), wherein state 1 applies when a number of said occurrences exceeds a certain threshold T, and state 0 applies when a number of said occurrences falls below said certain threshold T, being represented as:

$$S_n = \begin{cases} 0 & \text{if } x_n \leq T \\ 1 & \text{if } x_n > T \end{cases}$$

wherein said transition probabilities p(i|j) are switching probabilities from state j to state i, characterized by the probability that $S_n$=i given that $S_{n-1}$=j, being a total of four transition probabilities;

computing said four transition probabilities for a last N states $S_n$, where N is a predetermined number;

conducting a supervised training session utilizing a set of J X-ray tubes, which have failed due to known causes and considering two independent probabilities p(1|1) and p(1|0), said training session comprising:

computing two-dimensional feature vectors $f_i$={p(1|1), p(1|0)}$_i$ for an initial M windows of N scans, thereby forming a first vector set, computing the two-dimensional feature vectors $f_f$={p(1|1), p(1|0)}$_f$ for a final N number of scans, thereby forming a second vector set, plotting a scatter-diagram of all two-dimensional feature vectors $(f_i)_n$ and $(f_f)_n$, (n=1 . . . J), and deriving a pattern classifier by estimating an optimal linear discriminant which separates the first and second vector sets; and applying said classifier to monitor a persistence of occurrences of said arcing in an operation of said X-ray tube.

5. A method for providing predictive maintenance of an X-ray tube as recited in claim 4, including the steps of:

updating said transition probabilities at each scan; and constructing a feature vector f={p(1|1), p(1|0)}.

6. A method for providing predictive maintenance of an X-ray tube as recited in claim 5, including the step of:

providing a warning of imminent failure of said X-ray tube if f falls into a region of said classifier indicating failure prediction.

7. Apparatus for providing predictive maintenance of a device, comprising:

means for modeling as a time series $x_n$ of a discretely sampled signal representative of occurrences of a defined event in the operation of said device, said time series $x_n$ being modeled as two-state first order Markov processes with associated transition probabilities p(i|j), wherein state 1 applies when a number of said occurrences exceeds a certain threshold T, and state 0 applies when a number of said occurrences falls below said certain threshold T, being represented as:

$$S_n = \begin{cases} 0 & \text{if } x_n \leq T \\ 1 & \text{if } x_n > T \end{cases}$$

wherein said transition probabilities p(i|j) are switching probabilities from state j to state i, characterized by the probability that $S_n$=i given that $S_{n-1}$=j, being a total of four transition probabilities;

means for computing said four transition probabilities for a last N states $S_n$, where N is a predetermined number;

means for conducting a supervised training session utilizing a set of J devices, which have failed due to known causes and considering two independent probabilities p(1|1) and p(1|0), said means for conducting a supervised training session comprising means for:

computing the two-dimensional feature vectors $f_i$={p(1|1), p(1|0)}$_i$ for a final N number of scans, thereby forming a second vector set, computing two-dimensional feature vectors $f_f$={p(1|1), p(1|0)}$_f$ for a final N number of scans, thereby forming a second vector set, plotting a scatter-diagram of all two-dimensional feature vectors $(f_i)_n$ and $(f_f)_n$, (n=1 . . . J), and deriving a pattern classifier by estimating an optimal linear discriminant which separates the first and second vector sets; and means for applying said classifier to monitor a persistence of occurrences of said defined event in the operation of said device.

* * * * *